(12) United States Patent
Omotani et al.

(10) Patent No.: US 6,553,823 B2
(45) Date of Patent: Apr. 29, 2003

(54) MODEL FOR WIND TUNNEL TEST

(75) Inventors: Hideo Omotani, Wako (JP); Hiroki Oyama, Wako (JP); Masaki Kobayashi, Wako (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 10/038,774

(22) Filed: Jan. 8, 2002

(65) Prior Publication Data

US 2002/0088276 A1 Jul. 11, 2002

(30) Foreign Application Priority Data

Jan. 9, 2001 (JP) ........................................ 2001-001235

(51) Int. Cl.⁷ .............................................. G01M 9/00
(52) U.S. Cl. ........................................ 73/147; 73/865.9
(58) Field of Search ............................ 73/147, 148, 86, 73/40.7, 756; 29/897.2, 464; 102/503, 513

(56) References Cited

U.S. PATENT DOCUMENTS

| | | | | |
|---|---|---|---|---|
| 4,653,317 A | * | 3/1987 | Schtafer | 73/147 |
| 4,688,422 A | * | 8/1987 | Wood | 73/147 |
| 4,845,993 A | * | 7/1989 | Horne et al. | 73/147 |
| 4,882,997 A | * | 11/1989 | Baxter et al. | 102/503 |
| 4,922,748 A | * | 5/1990 | Hopenfeld | 73/86 |
| 6,415,510 B2 | * | 7/2002 | Mertens et al. | 29/897.2 |

FOREIGN PATENT DOCUMENTS

| | | |
|---|---|---|
| JP | 10-274590 | 10/1998 |
| JP | 2000-227384 | 8/2000 |

* cited by examiner

*Primary Examiner*—Max Noori
*Assistant Examiner*—Alandra N. Ellington
(74) *Attorney, Agent, or Firm*—Arent Fox Kintner Plotkin & Kahn, PLLC

(57) ABSTRACT

A model for a wind tunnel test fabricated at a low cost, in which a plurality of small bores opening on a surface of a wing and a plurality of passages permitting the small bores to communicate therewith. The plurality of small bores and the plurality of passages are so disposed that they do not interfere with each other.

5 Claims, 4 Drawing Sheets

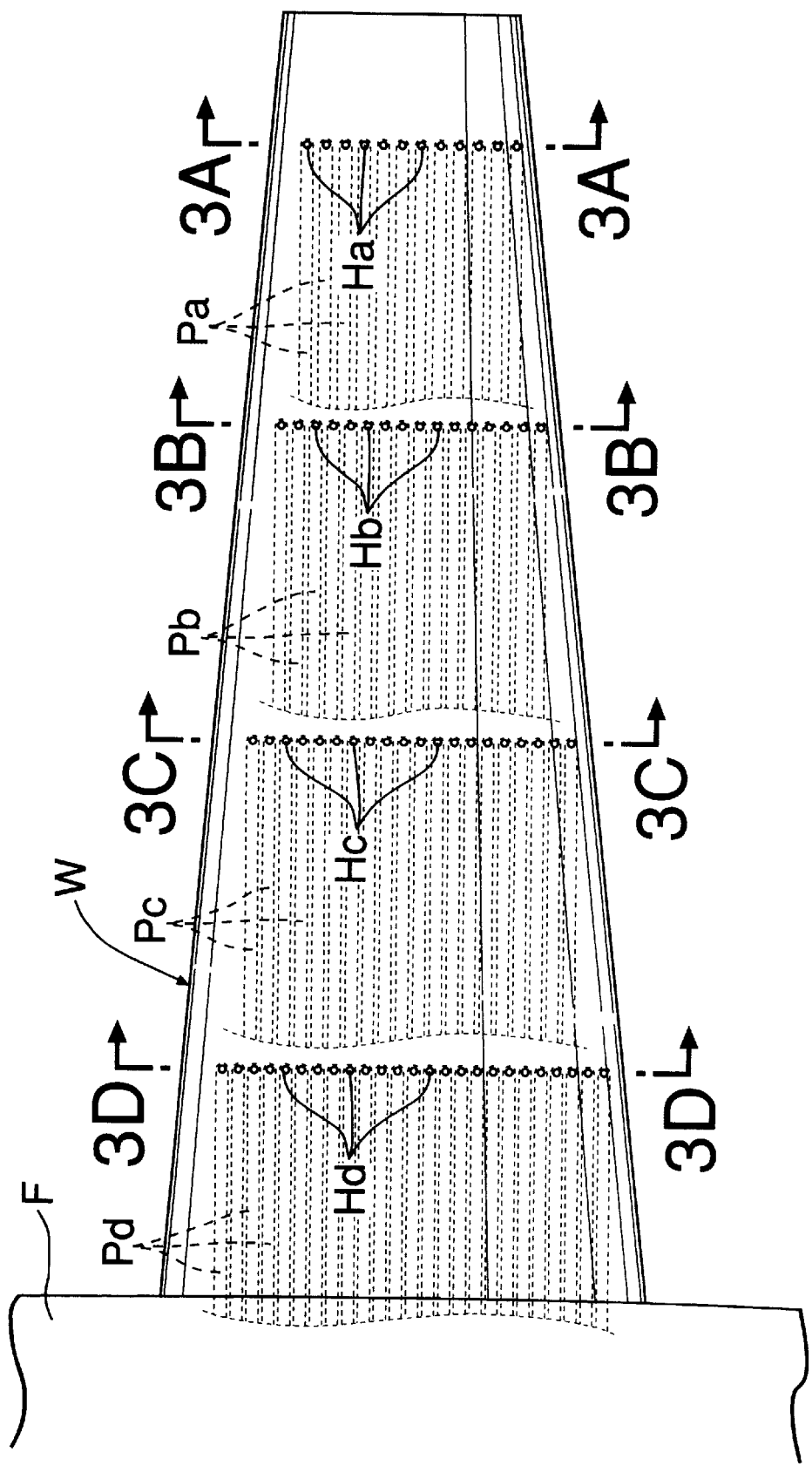

MODEL FOR WIND TUNNEL TEST

BACKGROUND OF THE INVENTION

1. Field of the Invention

The present invention relates to a model for a wind tunnel test, including at least one wing, a plurality of small bores defined at different locations on a surface of a wing in the wing span direction to communicate with a plurality of passages defined in the wing span direction within the wing and extending to a wing root.

2. Description of the Related Art

Conventional models for a wind tunnel test which measures a distribution of pressure on a surface of a main wing of an airplane are known and described in Japanese Patent Application Laid-open Nos. 10-274590 and 2000-227384.

The model for a wind tunnel test described in Japanese Patent Application Laid-open No. 10-274590, includes pipes which are inserted into pressure-detecting bores made through an outer plate of a hollow main wing from the side of an inner surface of the main wing to a thicknesswise intermediate portion of the outer plate and which are fixed by soldering.

The model for a wind tunnel test also described in Japanese Patent Application Laid-open No.2000-227384, includes a groove made on the surface of a main wing made of a metal and NC-treated to extend in a span direction. The model further includes a copper pipe having pressure-detecting bores and is fitted into the groove with a clearance filled with a resin. In addition, the model for the wind tunnel test described in Japanese Patent Application Laid-open No.2000-227384, includes pressure-detecting bores which open into a surface of a main wing, and includes passages which permit the pressure-detecting bores to communicate with a pressure sensor. The pressure-detecting bores and the passages are integrally formed upon formation of the main wing by a photo-forming process.

To accurately measure the distribution of the pressure on the surface of a main wing, a large number of pressure-detecting bores are required. Therefore, the number of passages permitting the pressure-detecting bores to communicate with a pressure sensor is also increased in relation to an increase in the number of the pressure-detecting bores. For this reason, it is difficult to dispose the passages within the main wing. For example, in the above-described model including the pipes inserted into the pressure-detecting bores and soldered therein, or in the above-described model including the copper pipe having the pressure-detecting bores and embedded in the groove made in the surface of the main wing, the processing or treatment of these models is extremely troublesome. Additionally, due to the fact that the passages provided in the pipes and the copper pipe intersect each other, the number of pressure-detecting bores is limited. In the model in which the main wing is integrally provided with the pressure-detecting bores and wherein the passages are formed by the photo-forming process, it is possible to remarkably reduce the number of processing steps and the processing cost. However, when the large number of pressure-detecting bores are distributed in the surface of the main wing, the number of pressure-detecting bores may not be increased. Specifically, the passages defined in the span direction to connect the pressure-detecting bores adjacent to the wing tip to the pressure sensor, interfere with the pressure-detecting bores adjacent to the wing root, thereby obstructing any increase in number of the pressure-detecting bores. Specifically, the passages defined in the span direction to connect the pressure-detecting bores adjacent to the wing tip to the pressure sensor, interfere with the pressure-detecting bores adjacent to the wing root, thereby obstructing any increase in number of the pressure-detecting bores.

SUMMARY OF THE INVENTION

The present invention has been accomplished with the above circumstance in view. Therefore, an object of the present invention is to enable the fabrication of a model for a wind tunnel test at a low cost. The model for a wind tunnel test includes a plurality of small bores opening on a surface of a wing and passages permitting the small bores to communicate with the wing root so that the small bores and the passages do not interfere with each other.

To achieve the above object, the present invention provides, for example, a model for a wind tunnel test, including at least one wing, a plurality of small bores defined on a surface of a wing at different locations in the wing span direction, and a plurality of passages which are defined in the wing span direction within the wing and extending to a wing root, the plurality of passages communicating with the small bores, wherein the wing is formed by curing a photo-setting resin sequentially in the wing span direction by a photo-forming process, wherein the passages are formed integrally within the wing upon the formation of the wing by the photo-forming process, and wherein the passages leading to the small bores that are adjacent to the wing root are disposed nearer to the surface of the wing, as compared with the passages leading to the small bores that are adjacent to a wing tip.

With the above arrangement, the model for the wind tunnel test is formed by the photo-forming process. Therefore, the time and cost required for the fabrication of the model can be reduced. Also, the large number of the passages can be formed simultaneously within the wing upon the formation of the wing without application of a special mechanical treatment. In addition, the passages leading to the small bores adjacent to the wing root are disposed nearer to the surface of the wing, as compared with the passages leading to the small bores adjacent to the wing tip. Therefore, the interference between the passages leading to the small bores adjacent to the wing tip and the passages leading to the small bores adjacent to the wing root can be reliably avoided. Accordingly, it is possible to remarkably increase the degree of freedom of arrangement of the small bores.

The present invention also provides a model for a wind tunnel test in which the small bores are pressure-detecting bores for measuring a distribution of pressure on the surface of the wing.

With the above arrangement, a distribution of pressure on the surface of the wing can be measured by using the small bores as the pressure-detecting bores.

The present invention also provides a model for a wind tunnel test in which the small bores are air-suction/ejection bores for controlling a boundary layer on the surface of the wing.

With the above arrangement, air on the surface of the wing can be sucked, or air can be ejected to the surface of the wing, by using the small bores as the air-suction/ejection bores, thereby performing the simulation of a boundary layer control.

The present invention further provides a model for a wind tunnel test in which the small bores are tracer-ejection bores for visualizing the flow of air on the surface of the wing.

With the above arrangement, the flow of air on the surface of the wing can be visualized by using the small bores as the tracer-ejection bores.

In addition, the present invention provides a model for a wind tunnel test in which the small bores are air-ejection bores for ejecting air for cooling the surface of the wing.

With the above arrangement, an air film can be formed on the surface of the wing by using the small bores as the air-ejection bores to perform the simulation of air-cooling.

BRIEF DESCRIPTION OF THE DRAWINGS

FIG. 2 is a view taken in a direction of an arrow 2 in FIG. 1.

DETAILED DESCRIPTION OF THE INVENTION

The mode for carrying out the present invention will now be described by way of an embodiment of the present invention shown in the accompanying drawings.

Figure 1:
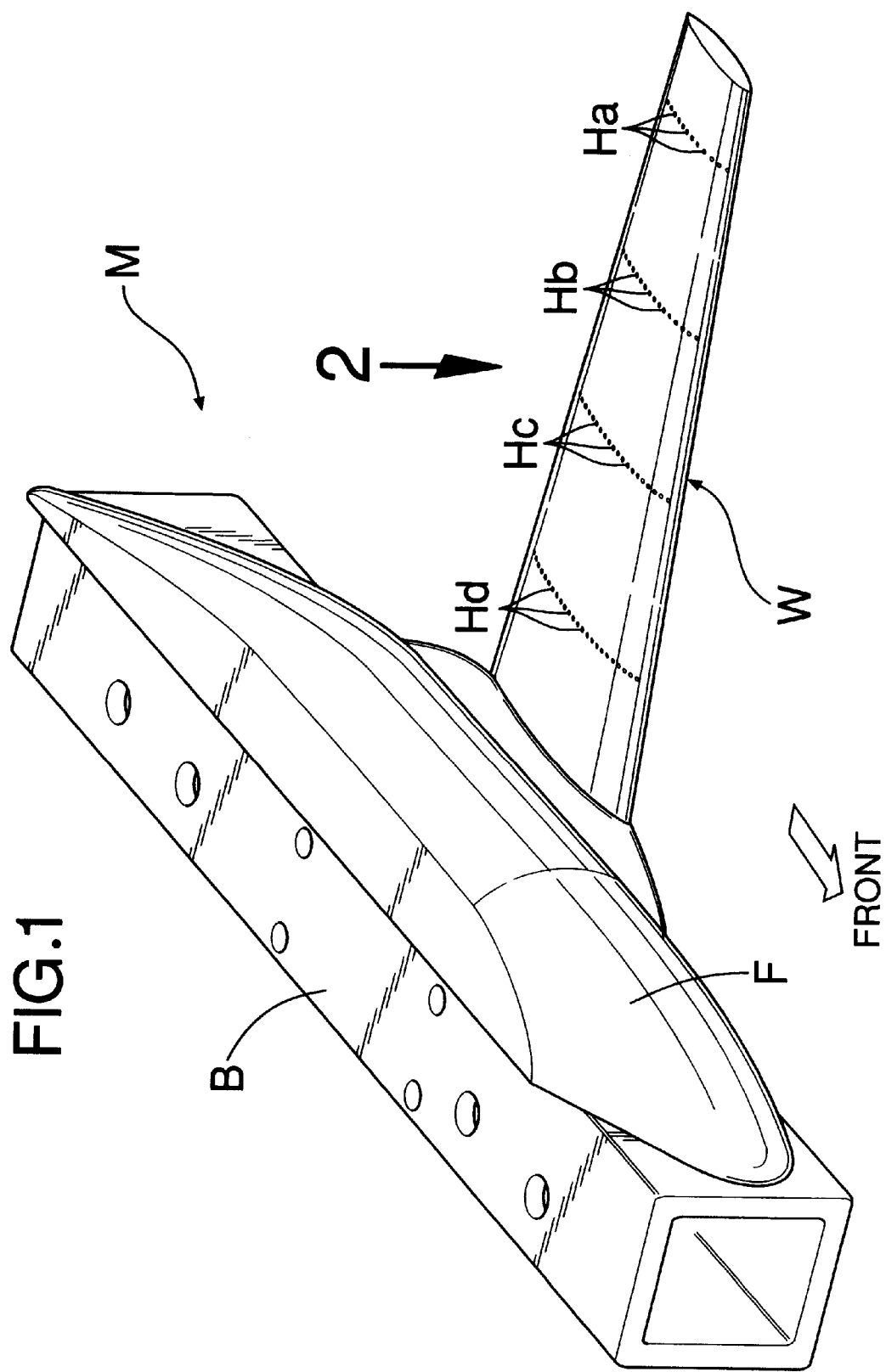
FIG. 1 is a perspective view of a model for a wind tunnel test.

FIGS. 1 to 4 show an embodiment of the present invention. FIG. 1 is a perspective view of a model for a wind tunnel test; FIG. 2 is a view from the direction of arrow 2 shown in FIG. 1; FIGS. 3A, 3B, 3C and 3D show sectional views taken along lines 3A—3A, 3B—3B, 3C—3C and 3D—3D respectively shown in FIG. 2; and FIGS. 4A, 4B, 4C and 4D explain the steps of forming a main wing by a photo-forming process.

In FIG. 1, there is shown a model M for a wind tunnel test. The model M is intended to measure the distribution of the pressure in the directions of chords on the upper and the lower surfaces of a main wing W of an airplane at four points spaced apart from one another in a span direction. The shape of the airplane is laterally symmetrical, and the state of a flow of air is also laterally symmetrical. Therefore, in the model M for the wind tunnel test, only the left half of a fuselage F and a left main wing W are formed as viewed at a boundary provided by a vertical plane passing through an axis of the airplane. Additionally, a support bracket B for supporting, within a wind tunnel, the model M for the wind tunnel test is integrally formed on the right side of the fuselage F.

Pressure-detecting bores Ha, Hb, Hc and Hd are defined in a plurality of chords (e.g., four chords) spaced apart from one another in a direction of span of the main wing W. The pressure-detecting bores Ha, Hb, Hc and Hd measure the distribution of the pressure in airfoils corresponding to each chord. The first set of pressure-detecting bores Ha is nearest to the wing tip. The second set of pressure-detecting bores Hb adjoins the first set of pressure-detecting bores Ha on the side of the wing root, and the third set of pressure-detecting bores Hc adjoins the second set of pressure-detecting bores Hb on the side of the wing root. The pressure-detecting bores Ha, Hb and Hc open into only the upper surface of the main wing W. The fourth set of pressure-detecting bores Hd is nearest to the wing root open into both of the upper and lower surfaces of the main wings W. The pressure-detecting bores Ha, Hb, Hc and Hd may be of any number, respectively. However, in this embodiment, for example, there are 12 pressure-detecting bores Ha in the first set; there are 16 pressure-detecting bores Hb in the second set; there are 20 pressure-detecting bores Hc in the third set; and there are 25 pressure-detecting bores Hd in the upper surface, and 10 pressure-detecting bores Hd in the lower surface in the fourth set.

The first set of 12 pressure-detecting bores Ha located nearest to the wing tip communicate with the tip ends of the first set of 12 passages Pa extending from the wing roots toward the wing tip within the main wing W, respectively. The first set of 12 passages Pa are disposed at a widthwise and thicknesswise substantially central potion of the main wing W, e.g., on a chord line in the embodiment. The first set of 12 passages Pa are shown by white circles in FIGS. 3A to 3D.

The second set of 16 pressure-detecting bores Hb communicate with the tip ends of the second set of 16 passages Pb extending from the wing root toward the wing tip within the main wing W, respectively. The second set of 16 passages Pb are disposed above the first set of 12 passages Pa (namely, at locations nearer to the upper surface of the main wing W). The second set of 16 passages Pb are shown by black circles in FIGS. 3B to 3D.

The third set of 20 pressure-detecting bores Hc communicate with the tip ends of the third set of 20 passages Pc extending from the wing roots toward the wing tip within the main wing W. The third set of 20 passages Pc are disposed above the second set of 16 passages Pb (namely, at locations nearer to the upper surface of the main wing W). The third set of 20 passages Pc are shown by circles affixed with crosses in FIGS. 3C and 3D.

The fourth set of 25 pressure-detecting bores Hd opening into the upper surface of the main wing W communicate with the tip ends of the fourth set of 25 passages Pd extending from the wing root toward the wing tip within the main wing W, respectively. The fourth set of 25 passages Pd are disposed above the third set of 20 passages Pc (namely, at locations nearer to the upper surface of the main wing W). Additionally, the fourth set of 10 pressure-detecting bores Hd opening into the lower surface of the main wing W communicate with the tip ends of the fourth set of 10 passages Pd extending from the wing root toward the wing tip within the main wing W, respectively. The fourth set of 10 passages Pd are disposed below the first set of 12 passages Pa (namely, at locations nearer to the lower surface of the main wing W). The fourth set of 35 upper and lower passages Pd in total are shown by netted circles in FIG. 3D.

A process of forming the main wing W having the above-described structure by a photo-forming process will be described below with reference to FIGS. 4A to FIG. 4D.

Figure 4B:
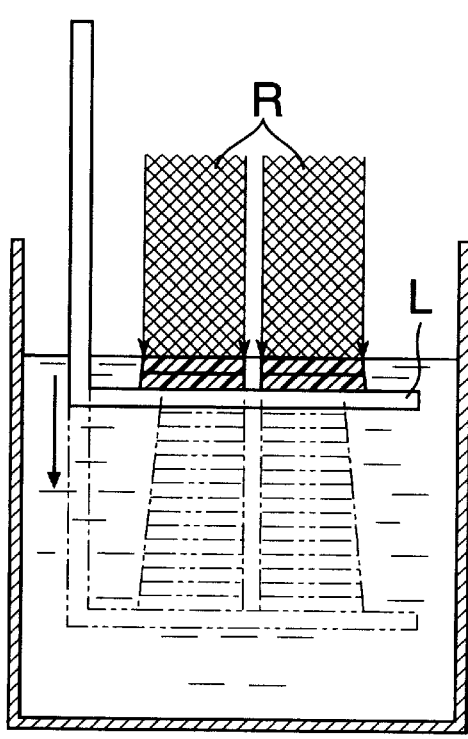
FIGS. 4A, 4B, 4C and 4D illustrate the steps of forming a main wing by a photo-forming process.
Figure 4A:
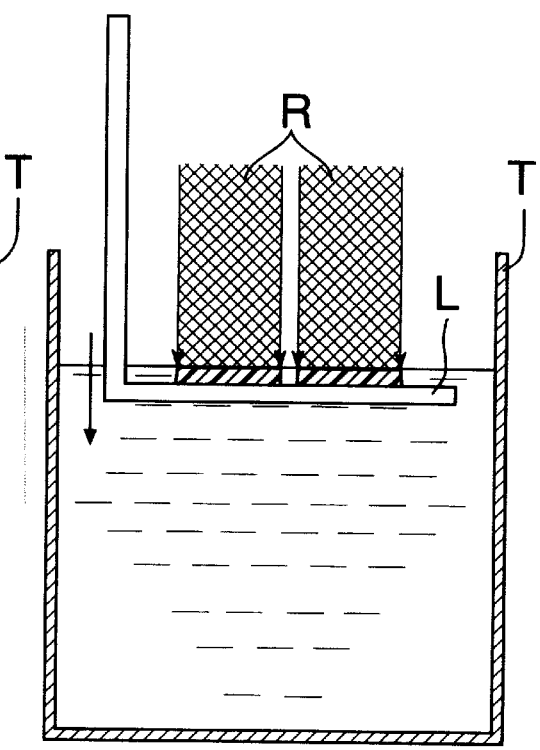
Figure 4D:
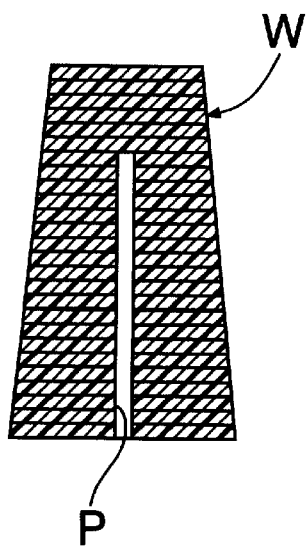

As shown in FIG. 4A, a lift L connected to a drive source (not shown) is mounted for upward and downward movements within a tank T filled with a photosetting resin. The upper surface of the lift L is set, for example, one pitch (e.g., 0.1 mm) lower in level than the surface of the photo-setting resin. An ultraviolet laser beam R of a predetermined pattern is applied to a thin film of the photo-setting resin on the lift L, and the photo-setting resin corresponding to the irradiated portion is cured to form a first resin layer. Subsequently, the lift L is lowered by another pitch, for example, as shown in FIG. 4B. The ultraviolet laser beam R of the predetermined pattern is then applied to the thin film of the photo-setting resin covering the first resin layer, thereby curing the photo-setting resin corresponding to such irradiated portion to form a second resin layer laminated on the first resin layer.

Figure 4C:
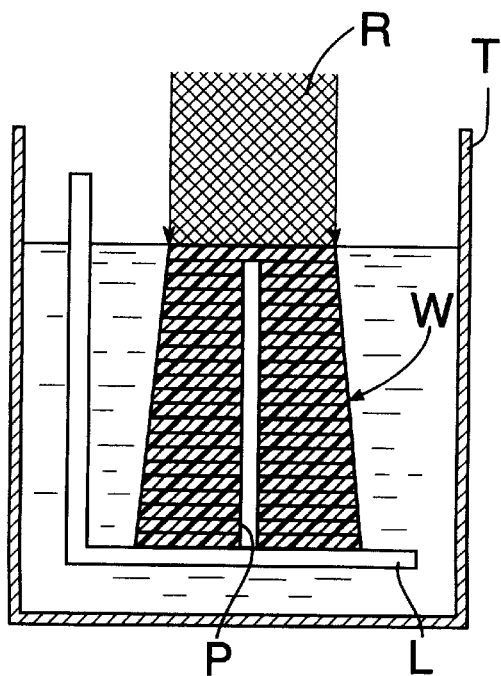

The entire main wing W is formed sequentially from the side of the wing root to the wing tip by applying the ultraviolet laser beam R every time the lift L is lowered by one pitch in the above-described manner (see FIG. 4C). The main wing W in the present embodiment is, for example, a tapered wing. Therefore, the range of the application of the ultraviolet laser beam R is largest at the formation of the wing root portion and decreases gradually as the process proceeds toward the formation of the wing tip portion. The first to fourth sets of passages Pa to Pd provided in the main wing W are also formed simultaneously by the photo-forming process (see FIG. 4D). More specifically, if the ultraviolet laser beam R is not applied to areas corresponding to the first to fourth sets of passages Pa to Pd, then the portions of the photosetting resin in such areas are not cured and are left as the first to fourth sets of passages Pa to Pd.

Figure 3A:
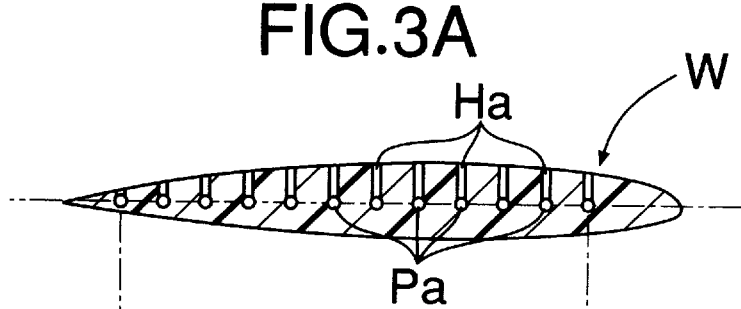
FIGS. 3A, 3B, 3C and 3D show sectional views taken along lines 3A—3A, 3B—3B, 3C—3C and 3D—3D, respectively in FIG. 2.
Figure 3B:
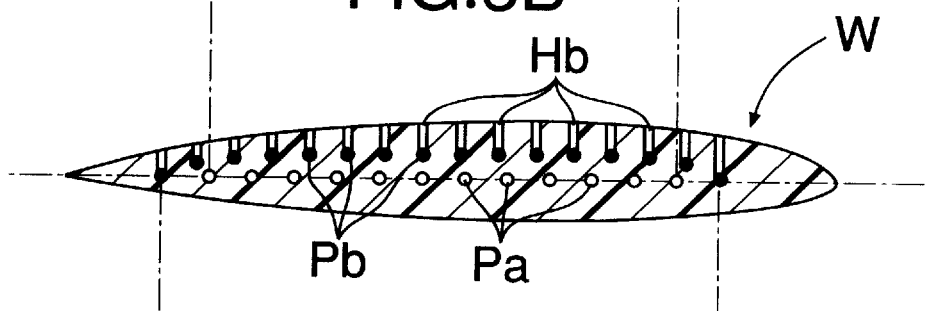
Figure 3C:
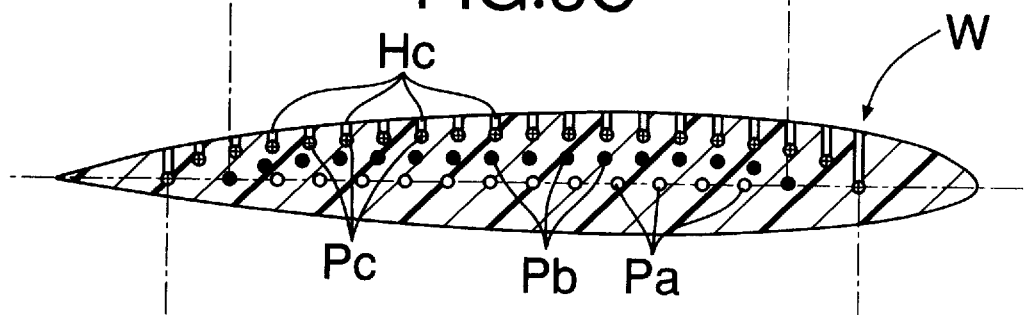
Figure 3D:
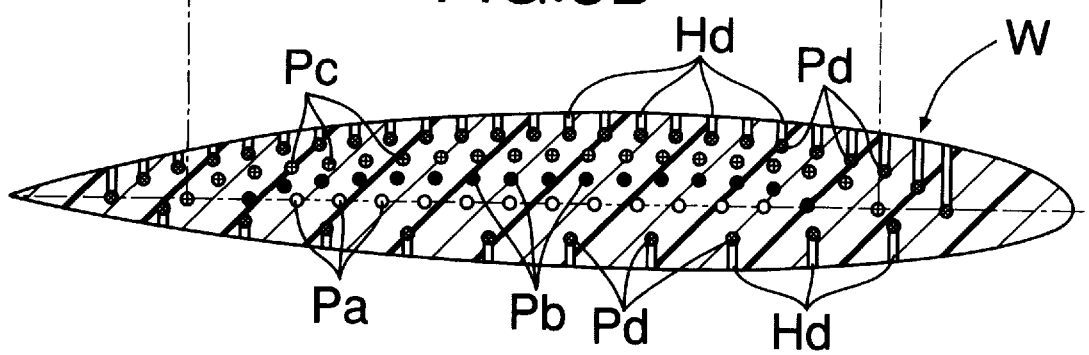

Therefore, the fourth set of 35 passages Pd, the third set of 20 passages Pc, the second set of 15 passages Pb and the first set of 12 passages, (i.e., the 83 passages in total) are formed in an area displaced from the fourth set of pressure-detecting bores Hd toward the wing root (see FIG. 3D). The third set of 20 passages Pc, the second set of 16 passages Pb and the first set of 12 passages Pa, (i.e., the 48 passages in total) are formed in an area from the third set of pressure-detecting bores Hc to short of the fourth set of pressure-detecting bores Hd (see FIG. 3C). The second set of 16 passages Pb and the first set of 12 passages Pa, (i.e., the 28 passages in total) are formed in an area from the second set of pressure-detecting bores Hb to short of the third set of pressure-detecting bores Hc (see FIG. 3B). Only the first set of 12 passages Pa are formed in an area from the first set of pressure-detecting bores Ha to short of the second set of pressure-detecting bores Hb (see FIG. 3A).

Only one of the passages P is shown in each of FIGS. 4A to 4D.

The diameter of each of the passages within the first to fourth sets of passages Pa to Pd defined in the main wing W is suitable, for example, to be about 1.5 mm, and the thickness between the adjacent to passages is desirable, for example, to be equal to or larger than 1.0 mm. The diameter of each of the pressure-detecting bores Ha to Hd within the first to fourth sets thereof is suitable, for example, to be on the order of 0.3 mm to 0.5 mm, and desirably formed, for example, by a mechanical treatment such as a drilling or the like rather than by the photo-forming process. The mechanical treatment is desired over the photo-forming process because a dimensional accuracy is required. However, there is no hindrance if preliminary bores are formed in advance by a photo-forming process prior to the formation of the first to fourth sets of pressure-detecting bores Ha to Hd by drilling.

However, each of the 83 total passages Pa to Pd within the first to fourth thereof is connected to a pressure sensor through a joint formed of a metal pipe and a pressure transfer pipe formed of a vinyl pipe. Therefore, when the model for the wind tunnel test including the main wing W is set against an air current, a static pressure depending on a flow speed on the surface of the main wing W is applied to the first to fourth sets of pressure-detecting bores Ha to Hd, and the static pressure is detected by the pressure sensor through the first to fourth sets of pressure-detecting bores Ha to Hd. Accordingly, a distribution of the pressure in an airfoil corresponding to the four chords of the main wing W is measured.

The model M for the wind tunnel test provided by the present invention is formed by the photo-forming process as described above. Therefore, the time and cost required for manufacturing thereof can be reduced, as compared with a model M which is manufactured using an aluminum alloy. In addition, the first to fourth sets of passages Pa to Pd, which are long in the span direction, need not be formed by the mechanical treatment using a drill and the like, and can be formed simultaneously with the formation of the main wing W by the photo-forming process, thereby leading to a decreased number of treating steps.

Further, the first set of passages Pa, communicating with the first set of pressure-detecting bores Ha nearest to the wing tip, is disposed at the central portion of the cross section of the main wing W. The second set of passages Pb, communicating with the second set of pressure-detecting bores Hb located at the locations displaced from the first set of pressure-detecting bores Ha toward the wing root, is disposed at the locations displaced from the first set of passages Pa to the upper surface of the main wing W. The third set of passages Pc, communicating with the third set of pressure-detecting bores Hc located at the locations displaced from the second set of pressure-detecting bores Hb toward the wing root, is disposed at the locations displaced from the second passages Pb toward the upper surface of the main wing. Additionally, the fourth set of passages Pd, communicating with the fourth set of pressure-detecting bores Hd, which is located at the locations displaced from the third set of pressure-detecting bores Hc to the wing root and which open into the upper surface of the main wing W, is disposed at the locations displaced from the third set of passages Pc toward the upper surface of the main wing W. Furthermore, the fourth set of passages Pd, communicating with the fourth set of pressure-detecting bores Hd, which is located at the locations displaced from the third set of pressure-detecting bores Hc toward the wing root and which opens into the lower surface of the main wing W, is disposed at the locations displaced from the first set of passages Pa toward the lower surface of the main wing W. This ensures that even if the first to fourth sets of pressure-detecting bores Ha to Hd are disposed at any locations, they cannot interfere with any other of the first to fourth sets of passages Pa to Pd. Therefore, the degree of freedom to arrange the first to fourth sets of pressure-detecting bores Ha to Hd to form a variety of arrangements can be increased remarkably.

The small bores Ha to Hd opening into the surface of the main wing W are utilized as the pressure-detecting bores in this embodiment, but can also be used for another purpose. Specifically, if the small bores are used as air suction/ejection bores, then the air on the surface of the main wing W can be sucked into the surface, or the air can be ejected to the surface of the main wing W to effect the simulation of a boundary layer control. Alternatively, if the small bores are used as bores for ejection of a tracer comprising colored particles, then the flow of air on the surface of the main wing W can be visualized. Furthermore, if the small bores are used as air ejection bores provided in a rotor blade for the ejection of cooling air, then the simulation of a cooling effect on the surface of the rotor blade can be performed.

The present invention is not limited to the main wing W of the airplane, and is applicable to any wing.

Although the embodiment of the present invention has been described in detail, it will be understood that various modifications in design may be made without departing of the subject matter of the present invention.

What is claimed is:

1. A model for a wind tunnel test, including:
   at least one wing having a wing root at a first end of the wing and a wing tip at a second end of the wing which is opposite the first end;

a plurality of small bores disposed on a surface of the wing at different locations along a wing span direction extending from the wing root to the wing tip; and a plurality of sets of passages disposed in the wing span direction within the wing wherein each set of passages is provided at different depths of the wing relative to the remaining sets of passages and extending from the wing root toward the wing tip, each passage communicating with a corresponding bore, wherein the wing is formed by curing a photo-setting resin sequentially in the wing span direction by a photo-forming process, wherein the passages are formed integrally within the wing upon the formation of the wing by the photo-forming process, and wherein the passages and the small bores are located such that as the small bores come closer to the wing root, the passages communicating with the small bores come closer to the surface of the wing.

2. A model for a wind tunnel test according to claim 1, wherein the plurality of small bores are pressure-detecting bores for measuring a distribution of pressure on the surface of the wing.

3. A model for a wind tunnel test according to claim 1, wherein the plurality of small bores are air-suction/ejection bores for controlling a boundary layer on the surface of the wing.

4. A model for a wind tunnel test according to claim 1, wherein the plurality of small bores are tracer-ejection bores for visualizing the flow of air on the surface of the wing.

5. A model for a wind tunnel test according to claim 1, wherein the plurality of small bores are air-ejection bores for ejecting air for cooling the surface of the wing.

* * * * *